United States Patent [19]

Campana

[11] 4,054,777
[45] Oct. 18, 1977

[54] PROCESS AND WELDING ROD FOR THE WELDING OF DUCTILE CAST IRON

[76] Inventor: Patsie Carmen Campana, 2614 Sherwood Drive, Lorain, Ohio 44053

[21] Appl. No.: 612,664

[22] Filed: Sept. 12, 1975

[51] Int. Cl.$^2$ ............................................. B23K 35/22
[52] U.S. Cl. ............................. 219/137 WM; 148/26; 219/146
[58] Field of Search .............. 75/123 CB; 148/24, 26; 219/137 WM, 145, 146, 73 R, 76; 428/385

[56] References Cited

U.S. PATENT DOCUMENTS

| | | | |
|---|---|---|---|
| 1,352,534 | 9/1920 | Russell | 219/146 X |
| 1,502,789 | 7/1924 | Lincoln | 219/145 X |
| 2,931,886 | 4/1960 | Nunnelee et al. | 219/76 |
| 3,023,302 | 2/1962 | Kennedy et al. | 148/26 X |
| 3,114,033 | 12/1963 | Elster et al. | 219/146 |
| 3,301,997 | 1/1967 | Semenchuk | 219/137 WM |
| 3,471,310 | 10/1969 | Joseph et al. | 428/385 X |
| 3,860,420 | 1/1975 | Nayar | 219/145 X |

*Primary Examiner*—Gerald P. Tolin
*Assistant Examiner*—N. D. Herkamp

*Attorney, Agent, or Firm*—Fay & Sharpe

[57] ABSTRACT

A process for the electric arc welding of cast iron, specifically ductile cast iron, is provided which comprises electrically applying to the cast iron to be welded, at welding temperatures, a welding material obtained by simultaneously melting a first and a second welding rod; the first welding rod containing, by weight, about 0.085 to about 0.095 percent carbon, about 0.0285 to about 0.0315 percent chromium, about 0.0095 to about 0.0105 percent nickel, about 0.0095 to about 0.0105 percent molybdenum, about 0.618 to about 0.672 percent manganese, about 0.01615 to about 0.01785 percent sulphur, about 0.01805 to about 0.01995 percent phosphorus, about 2.50 percent silicon, with the balance being iron plus incidental impurities, the first welding rod being provided with a low hydrogen fluxing material; the second welding rod containing, by weight, about 2.85 percent carbon, about 0.01 percent chromium, about 0.10 percent nickel, about 0.05 percent molybdenum, about 0.50 percent manganese, about 0.08 percent sulphur, about 0.50 percent phosphorus, about 2.50 percent silicon, with the balance being iron plus incidental impurities.

5 Claims, No Drawings

PROCESS AND WELDING ROD FOR THE WELDING OF DUCTILE CAST IRON

BACKGROUND OF THE INVENTION

The present invention relates to the welding of cast iron at ambient temperatures without the application of additional heat.

It is customary in the art to hot weld cast iron. In those processes, the cast iron structure which is to be welded is first heated by an external or supplemental means and then the welding material is applied thereto. Obviously, there are certain drawbacks or limitations associated with the implementation of such a hot welding process which are to be avoided or at least minimized, if at all possible. For example, it is often impossible to hot weld assembled cast iron structures which are placed in confined areas having limited access.

Accordingly, it is the primary objective of this invention to provide a means for welding cast iron, especially ductile cast iron, at ambient temperatures without the application of supplemental heat.

In addition, it is a further object of the invention to provide various electrode structures which are especially suited for use in the process of the instant invention.

These and other objects of the invention will be obvious to those skilled in the art from a reading of the following specification and claims.

RELATED APPLICATIONS

On even date herewith, the inventor of the innovation described herein has also filed certain other applications which relate to the welding of various forms of cast iron. These applications are as follows: U.S. patent application Ser. No. 612,666 filed Sept. 12, 1975 for "A Process and Welding Rod for Welding Gray Cast Iron"; U.S. patent application Ser. No. 612,667, filed Sept. 12, 1975 entitled "A Process and Welding Rod for the Welding of White Cast Iron"; U.S. patent application Ser. No. 612,674, filed Sept. 12, 1975 entitled "A Process and Welding Rod for the Welding of Malleable Cast Iron"; and U.S. patent application Ser. No. 612,665, filed Sept. 12, 1975 entitled "Process and Coated Welding Rod for Welding White Cast Iron".

SUMMARY OF THE INVENTION

Broadly stated the instant invention concerns a novel process for the electric arc welding of cast iron of the type generally referred to as ductile iron without the application of supplemental heat. Basically, this is accomplished by depositing a weld on the article to be welded by simultaneously melting two unique welding rods.

More specifically the present invention relates to a process for the electric arc welding of cast iron containing, by weight, about 3.0 to about 4.0 percent carbon, about 1.8 to about 2.8 percent silicon, about 0.10 to about 1.0 percent manganese, about 0.00 to about 0.03 percent sulphur, about 0.00 to about 0.10 percent phosphorus, with the balance being iron plus incidential impurities which comprises electrically applying to the cast iron to be welded, at welding temperatures, a welding material obtained by simultaneously melting a first and a second welding rod; the first welding rod containing, by weight, about 0.085 to about 0.095 percent carbon, about 0.0285 to about 0.0315 percent chromium, about 0.0095 to about 0.0105 percent nickel, about 0.0095 to about 0.0105 percent molybdenum, about 0.618 to about 0.672 percent manganese, about 0.01615 to about 0.01785 percent sulphur, about 0.01805 to about 0.01995 phosphorus, about 2.50 percent silicon, with the balance being iron plus incidential impurities and the first welding rod being provided with a low hydrogen fluxing material; the second welding rod containing, by weight, about 2.85 percent carbon, about 0.01 percent chromium, about 0.10 percent nickel, about 0.05 percent molybdenum, about 0.50 percent manganese, about 0.08 percent sulphur, about 0.50 percent phosphorus, about 2.50 percent silicon, with the balance being iron plus incidential impurities.

DESCRIPTION OF THE PREFERRED EMBODIMENTS OF THE INVENTION

As before noted, the present invention concerns a process for welding ductile cast iron and special welding rods which are used in this process. For the purpose to this invention, ductile iron shall be cast iron having the composition set forth in Table 1 below.

Table 1

| (Cast Ductile Iron Composition) | |
|---|---|
| Element | Weight Percent |
| Carbon | 3.00 – 4.00 |
| Silicon | 1.80 – 2.80 |
| Manganese | 0.10 – 1.00 |
| Sulphur | 0.00 – 0.03 |
| Phosphorus | 0.00 – 0.10 |
| | Bal. Fe, plus incidental impurities |

In the practice of the invention, in general, welding of the concerned cast iron structure is accomplished as follows:

a. the metal surface is prepared for welding by scarfing it with a selected rod so as to not leave any charred surface, b. the surface to be welded is scarfed to the proper width in order to insure that the total welded surface will be penetrated, c. the selected first welding rod and second welding rod are simultaneously applied and mixed to the desired degree, and d. the setting of amperage and voltage on the welding machine are maintained within the limits recommended for the selected welding rods.

When utilizing the technique of the invention the amount of electric current to be employed is a function of welding rod size. Specifically, with respect to the second welding rod, the electric current to be utilized generally follows the guide lines set forth in Table 2 below.

Table 2

| Rod Diameter | Amperage |
|---|---|
| ⅛" | About 625 to about 700 |
| ¼" | About 725 to about 850 |
| ⅜" | About 900 to about 1100 |
| ½" | About 1100 to about 1500 |

The first welding rod contains, by weight, about 0.085 to about 0.095 percent carbon, about 0.0285 to about 0.0315 percent chromium, about 0.0095 to about 0.0105 percent nickel, about 0.0095 to about 0.0105 percent molybdenum, about 0.618 to about 0.672 percent manganese, about 0.01615 to about 0.01785 percent sulphur, about 0.01805 to about 0.01995 phosphorus, about 2.50 percent silicon, with the balance being iron plus incidential impurities.

The preferred first rod composition is, by weight, about 0.09 percent carbon, about 0.03 percent chromium, about 0.01 percent nickel, about 0.01 percent molybdenum, about 0.64 percent manganese, about 0.017 percent sulphur, about 0.019 percent phosphorus, about 2.5 percent silicon, with the balance being iron plus incidential impurities.

In addition, the first weld rod, i.e., the low hydrogen rod, is provided with a suitable flux. Such fluxes are well known in the art and therefore will not be discussed in detail. However, a specific flux composition which has worked exceptionally well includes, by weight, about 43.6 percent calcium carbonate, about 29.2 percent ferric oxide, about 12.5 percent aluminum oxide, about 6.2 percent silicon dioxide, and about 8.5 percent clay. Also, it should be noted with regard to this preferred fluxing composition, when direct current welding is concerned it is preferred to use a sodium silicate clay whereas when alternating current welding is involved it is preferred to use a potassium silicate clay.

The flux can be applied to the concerned welding rod in a number of ways. For example, the rod can be grooved or cored and the so-formed cavity filled with the fluxing material. However, it is preferred to simply coat the concerned welding rod with the desired fluxing material.

In view of the fact that the method manufacture and applying the fluxing material are well known in the art the same shall not be described herein in detail.

The second welding rod contains by weight, about 2.85 percent carbon, about 0.01 percent chromium, about 0.10 percent nickel, about 0.05 percent molybdenum, about 0.50 percent manganese, about 0.08 percent sulphur, about 0.50 percent phosphorus, about 2.50 percent silicon, with the balance being iron plus incidential impurities.

As the method of producing the alloys utilized to fabricate the first and second welding rod are well known in the metallurgical art, for the sake of brevity, such techniques will not be discussed herein.

The instant invention has been successfully practiced with numerous welding rods of the type hereinbefore described. A typical example of the practice of the invention is as follows:

EXAMPLE

A specimen of cast iron was selected and surface treated by scarfing. The scarfing was continued to the degree necessary to insure that the total surface to be welded would be penetrated. A first welding rod of the herein described preferred composition (having a coating of the herein described preferred flux on the surface) was simultaneously melted with a second welding rod containing, by weight, about 2.85 percent carbon, about 0.01 percent chromium, about 0.10 percent nickel, about 0.05 percent molybdenum, about 0.50 percent manganese, about 0.08 percent sulphur, about 0.50 percent phosphorus, about 2.50 percent silicon, with the balance being iron plus incidential impurities. The first welding rod was about 18 inches in length and had a diameter of ¼ inches. The second welding rod was about 18 inches long with a diameter of ¼ inches. The welding current ranged from about 1100 to about 1500 amps.

The resultant weld was then physically inspected and it was determined that a continuous, bonded, metallurgically suitable weld had been obtained.

While there have been described what are at present considered to be the preferred embodiments of this invention, it will be obvious to those skilled in the art that various changes and modifications may be made therein, without departing from the invention, and it is aimed, therefore, in the appended claims to cover all such changes and modifications as fall within the true spirit and scope of the invention.

It is claimed:

1. A process for the electric arc welding of cast iron comprising:
    providing a cast iron article to be welded containing, by weight, about 3.00 to about 4.00 percent carbon, about 1.80 to about 2.80 percent silicon, about 0.10 to about 1.00 percent manganese, about 0.00 to about 0.03 percent sulphur, about 0.00 to about 0.10 percent phosphorus, with the balance being iron plus incidential impurities;
    electrically applying to the cast iron to be welded, at welding temperatures, a welding material obtained by simultaneously melting a first and second welding rod;
    said first welding rod containing, by weight, about 0.085 to about 0.095 percent carbon, about 0.0285 to about 0.0315 percent chromium, about 0.0095 to about 0.0105 percent nickel, about 0.0095 to about 0.0105 percent molybdenum, about 0.618 to 0.672 percent manganese, about 0.01615 to about 0.01785 percent sulphur, about 0.01805 to about 0.01995 percent phosphorus, about 2.50 percent silicon, with the balance being iron plus incidential impurities, said first welding rod being provided with a low hydrogen fluxing material;
    said second welding rod containing, by weight, about 2.85 percent carbon, about 0.01 percent chromium, about 0.10 percent nickel, about 0.05 percent molybdenum, about 0.50 percent phosphorus, about 0.50 percent manganese, about 0.08 percent sulphur, about 2.50 percent silicon, with the balance being iron plus incidential impurites.

2. The process of claim 1 wherein said first welding rod has a coating of fluxing material thereon consisting essentially of about 43.6 weight percent calcium carbonate, about 29.2 weight percent ferric oxide, about 12.5 weight percent aluminum oxide, about 6.2 weight percent silicon dioxide, and about 8.5 weight percent clay.

3. The process of claim 2 wherein said clay is a sodium silicate clay.

4. The process of claim 2 wherein said clay is a potassium silicate clay.

5. The process of claim 1, wherein said first welding rod consists essentially of, by weight, about 0.09 percent carbon, about 0.03 percent chromium, about 0.01 percent nickel, about 0.01 percent molybdenum, about 0.64 percent manganese, about 0.017 percent sulphur, about 0.019 percent phosphorus, about 2.5 percent silicon, with the balance being iron plus incidential impurities.

* * * * *